(12) United States Patent
Dravis

(10) Patent No.: US 10,125,610 B2
(45) Date of Patent: Nov. 13, 2018

(54) AIR TURBINE ENGINE FOR MOVING VEHICLE

(76) Inventor: Martin Dravis, Howard Beach, NY (US)

( * ) Notice: Subject to any disclaimer, the term of this patent is extended or adjusted under 35 U.S.C. 154(b) by 212 days.

(21) Appl. No.: 12/799,539

(22) Filed: Apr. 27, 2010

(65) Prior Publication Data

US 2010/0300775 A1    Dec. 2, 2010

Related U.S. Application Data

(60) Continuation-in-part of application No. 11/699,843, filed on Jan. 31, 2007, now Pat. No. 7,763,988, and a continuation-in-part of application No. 12/378,961, filed on Feb. 23, 2009, now Pat. No. 7,804,185, and a continuation-in-part of application No. 12/798,919, filed on Apr. 14, 2010, now abandoned, said application No. 11/699,843 is a division of application No. 11/305,864, filed on Dec. 19, 2005, now abandoned, said application No. 12/378,961 is a division of application No. 11/305,864, filed on Dec. 19, 2005, now abandoned, said application No. 12/798,919 is a division of application No. 11/305,864, filed on Dec. 19, 2005, now abandoned.

(51) Int. Cl.
| | | |
|---|---|---|
| *F01D 1/00* | (2006.01) | |
| *F01D 1/02* | (2006.01) | |
| *F01D 15/10* | (2006.01) | |
| *F02C 1/02* | (2006.01) | |

(52) U.S. Cl.
CPC ............. *F01D 1/023* (2013.01); *F01D 15/10* (2013.01); *F02C 1/02* (2013.01); *F05D 2260/40311* (2013.01); *F05D 2260/96* (2013.01); *Y02T 50/671* (2013.01)

(58) Field of Classification Search
CPC .................................. F01D 1/023; F02C 1/02
USPC ....... 290/44, 55, 1 R; 180/2.1, 2.2; 415/916; 60/398
See application file for complete search history.

(56) References Cited

U.S. PATENT DOCUMENTS

| | | | | |
|---|---|---|---|---|
| 3,228,475 A | * | 1/1966 | Worthmann | ................... 416/188 |
| 3,556,239 A | * | 1/1971 | Spahn | ......................... 180/65.25 |
| 3,813,557 A | * | 5/1974 | Traeger | .............................. 290/2 |
| 3,880,250 A | * | 4/1975 | Emanuele | ................ 180/65.245 |
| 4,229,661 A | * | 10/1980 | Mead et al. | ..................... 290/44 |
| 4,578,955 A | * | 4/1986 | Medina | ........................ 60/709 |
| 5,831,341 A | * | 11/1998 | Selfors et al. | .................. 290/52 |
| 6,138,781 A | * | 10/2000 | Hakala | ........................... 180/2.2 |
| 7,045,913 B2 | * | 5/2006 | Ebrahim et al. | ............... 290/52 |

\* cited by examiner

*Primary Examiner* — Julio Gonzalez
(74) *Attorney, Agent, or Firm* — Weiss & Weiss Attorneys; Philip M. Weiss

(57) ABSTRACT

The invention discloses a non-fuel combusting air turbine assembly suitable as an auxiliary or primary power propulsion system for a vehicle. The systems include an air turbine engine powered by a compressor mechanism to increase the potential energy that is harnessed by the turbines, having a noise reducing air intake section for delivering air to the compressor. Additionally, the systems include a turbine mechanism composed of plural sets of stationary vanes and rotating vanes, preferably arranged alternatively, and a battery rechargeable by a generator operable by the rotating turbine vanes.

10 Claims, 4 Drawing Sheets

AIR TURBINE ENGINE FOR MOVING VEHICLE

RELATED APPLICATIONS

The present application is a continuation-in-part of application Ser. No. 11/699,843, filed Jan. 31, 2007, now U.S. Pat. No. 7,763,988 Ser. No. 12/378,961, filed Feb. 23, 2009, now U.S. Pat. No. 7,804,185 and Ser. No. 12/798,919, filed Apr. 14, 2010, now abandoned all of which are divisionals of application Ser. No. 11/305,864, filed Dec. 19, 2005, now abandoned.

FIELD OF THE INVENTION

This invention is directed to the field of air turbine engine systems of the type that may be used to power a vehicle, augment the power of a vehicle, and/or drive a generator to produce electricity, more particularly to an engine system having a series of turbines that have different capabilities, such as acceleration, compression, and extraction of the force of the wind to power the vehicle.

BACKGROUND OF THE INVENTION

The present invention relates to a unique air turbine engine system for a moving vehicle, such as an automobile, truck, airplane and the like. As will become clearer hereafter, there are two basic types of the engine according to the invention. The first category uses turbines to convert the energy produced by the compressors into mechanical energy in a similar manner to wind turbines, turbo prop and turbo shaft engines. The second type of engine will produce a high velocity stream of air in a similar manner to turbo jet or turbo fan engines.

Concerns over the environment, specifically pollution of the atmosphere, record costs of conventional fuels, and inadequate refining capacity for gasoline, have renewed interest in alternate propulsion system from moving vehicles. However, such interest has existed for a number of years, but have not yielded significant commercial systems to meet these concerns.

The prior art offers a number of turbine systems that may be used to power vehicles. Exemplary systems are noted in the following U.S. Patents:

U.S. Pat. No. 6,408,641 to Skur, III, teaches a hybrid turbine coolant system where air is extracted from a pressurized air source. An air-to-air heat exchanger receives and cools the extracted pressurized air. Further, an expansion turbine receives at least a portion of the cooled pressurized air from the air-to-air heat exchanger and expands the cooled pressurized air into chilled air while extracting work. An air-to-coolant heat exchanger receives the chilled air from the expansion turbine which is used to chill refrigerant coolant. The air-to-air heat exchanger also receives the chilled air reclaimed form the air-to-coolant heat exchanger, subsequent to chilling the refrigerant coolant, to cool the air extracted from the pressurized air source.

U.S. Pat. No. 5,644,170, to Bynum et al. relates to an atmospheric/aqua turbine is an apparatus for producing energy by allowing air or water to be metered by controls through an adjustable air or water scoop into twin turbines to produce electricity when the atmospheric/aqua turbine is installed on vehicle or a boat. The turbine is effective for a vehicle traveling at 30 mph or more, and in the case of a boat traveling at 8 to 10 mph or more.

U.S. Pat. No. 4,314,160 to Boodman et al. is directed to a system to provide additional electrical power in an electrically powered vehicle. An air scoop is mounted on the vehicle. The air scoop opens in a generally forward direction. A turbine wheel is mounted in the rear of the air scoop. An electric generator is connected to the turbine wheel, whereby air passing through the air scoop will generate additional electricity for the vehicle batteries. The air scoop is rotatable and means are provided to lock it in position.

U.S. Pat. No. 3,904,883 to Horwinski, discloses a unit for supplying power with the least possible local pollution to the environment, where the unit comprises both a prime mover with the fuel supply and also significantly large storage means for electric energy. The unit involves basically a dynamo-electric machine with a commutator-type armature and salient-field type rotator surrounding and rotatably carrying the armature. The rotator is turnable and has sets of slip rings at its ends, for effecting electric connections to the salient fields and also to brush holders which carry brushes bearing on the commutator. One opposite set of field pole windings is series connected and utilized as a series motor field winding, being connected with one set of brushes whereby the machine can operate as a series motor. Another set of field pole windings is adapted to function as a shunt generator field, the generator function involving a second set of brushes. All the said brushes bear on the same commutator. The armature shaft is coupled to drive a load which could for example be vehicle wheels or else a load of a stationary installation; and the rotary field structure or rotator is coupled to be driven by the prime mover which could be a gasoline engine, steam engine etc. Storage batteries are connected to drive the dynamo-electric machine as series motor, such as for propelling a vehicle, and can be recharged by the shunt generator portion of the dynamo-electric machine when the armature of the latter is being driven by the prime mover or gasoline engine. Suitable automatic electronic controls can be provided to determine the various modes of functioning of the prime mover and dynamo-electric machine.

U.S. Pat. No. 3,556,239 to Spahn, covers a battery powered automobile includes an air operated turbine fed by front and side air scoops for providing both charging current to the batteries and driving power for the automobile. An auxiliary internal combustion engine is included for use when necessary. Deceleration and wind sensitive controls operate door structure on the front air scoop so that it opens, increasing drag, only under predetermined conditions. Braking energy is utilized to help charge the batteries.

U.S. Pat. No. 3,444,946 to Waterbury, relates to an electric motor driven vehicle having at least one electric motor to supply power to said vehicle. The driving system further includes a mechanism associated with each electric motor to supply electric power thereto comprising batteries arranged in series, and either a solar cell supplying energy to the batteries, a power-generating means with paddle wheel and venturi tube or both adapted to supply power to the batteries. The above combination may be used either alone or in conjunction with a conventional internal combustion engine.

These prior art systems, though offering supplemental propulsion mechanisms for moving vehicles, they fail to offer the efficiency needed to effect an alternative and supplemental mechanism for new vehicles and for retrofitting to existing vehicles in the manner of the present invention. The manner by which the present invention achieves the goals hereof will become more apparent from the following description and accompanying drawings.

SUMMARY OF THE INVENTION

This invention relates to primary or an auxiliary power system for a vehicle selected from the class of automobiles, trucks, boats, airplanes, and the like. The invention teaches two basic types of engines: a) a turbo shaft variety that uses turbines to convert energy produced by the compressors into mechanical energy, and b) a turbo jet or turbo fan variety that produces a high velocity stream of air.

In a preferred embodiment of the turboshaft variety, the system may be used in conjunction with a secondary propulsion mechanism of a vehicle. The system comprises a non-fuel burning, air turbine engine powered by a compressor mechanism to increase the potential energy that is harnessed by the turbines. The air turbine engine comprising an optional noise reducing intake section opening towards the front of the vehicle, a centrifugal operating compressor to actively accelerate and compress the air passing through a noise reducing intake member. Although this version or embodiment uses a centrifugal compressor, axial compressors can be equally effective.

The second version or embodiment of the turbo shaft variety is a stand alone system for powering a generator, for example. This system transmits the compressed air to a turbine assembly, where the assembly comprises plural concentric vanes. In a preferred arrangement, there is a first set of vanes stationary with a second set of vanes alternately positioned with one first set of vanes. That is, there is one stationary set of vanes between each moving compressor or turbine. Accordingly, the compressed air is directed to each turbine by a set of fixed nozzle guide vanes that speeds up the air and shoots it at the correct angle for the moving turbine blades.

Accordingly, a feature of this invention lies in its use of one or more compressors to actively accelerate and compress incoming air for transition to a turbine assembly.

Another feature hereof is an auxiliary power propulsion system that includes a compressor section and turbine assembly, where the energy from the turbine assembly is used to generate electricity, power a variety of vehicle components, power the vehicle, and drive the compressor.

A further optional feature of the invention is an auxiliary power propulsion system for a vehicle where a driven axle of the vehicle may optionally drive the compressor section.

Still another feature hereof is the provision of a turbine assembly that may operationally utilize plural, alternating sets of rotating turbine blades and guide blades.

These and other features of this invention will become more apparent from the following description and accompanying drawings.

DETAILED DESCRIPTION OF THE PREFERRED EMBODIMENTS

A first embodiment of this relates to a turboshaft version for the invention and includes an auxiliary power propulsion system for a variety of vehicles to be used in conjunction with a secondary propulsion mechanism of the vehicle. Specifically, the preferred version hereof is designed for use on autos, trucks, trains, buses, airplanes, and other moving vehicles. It can also be used as a stationary air turbine to generate electricity. The basic concept is an air turbine engine that is powered by a compressor or a series of compressors, which increase the potential energy that is harnessed by the turbines. In the second embodiment, the turbo jet or turbo version, the system uses an electric motor to drive the compressor section, replacing the combustion section and producing a non-combusting engine. The needed electricity can be produced by numerous ways, including, but not limited to, solar cells, generators powered by either wind turbines or turboshaft varieties.

The system of this invention is different from a standard jet engine or a gas turbine engine in that it will not burn the compressed air. It is also different from other air turbines in that it employs a compressor(s) to actively accelerate and compress the air, where other versions of air turbines do not compress the air or they simply rely on the Bernoulli Effect to passively accelerate and compress the air. The compressors can be used either in conjunction with a funnel of decreasing size, taking advantage of the Bernoulli Effect or it can be used without a passive compression/acceleration device. In either case, the use of compressors greatly amplify the potential energy of any existing wind, or relative wind created by the motion of the vehicle.

This turbo shaft version of the air turbine engine is preferably used in conjunction with an electric engine, or a mechanical drive powered by the movement of the wheels of a moving vehicle or another air turbine. The turbines of the engine itself can also power the compressor(s) or augment the compressor drive. The option of a gasoline, diesel, or another type of engine can also be used to generate electricity for the electric engine.

Figure 1:
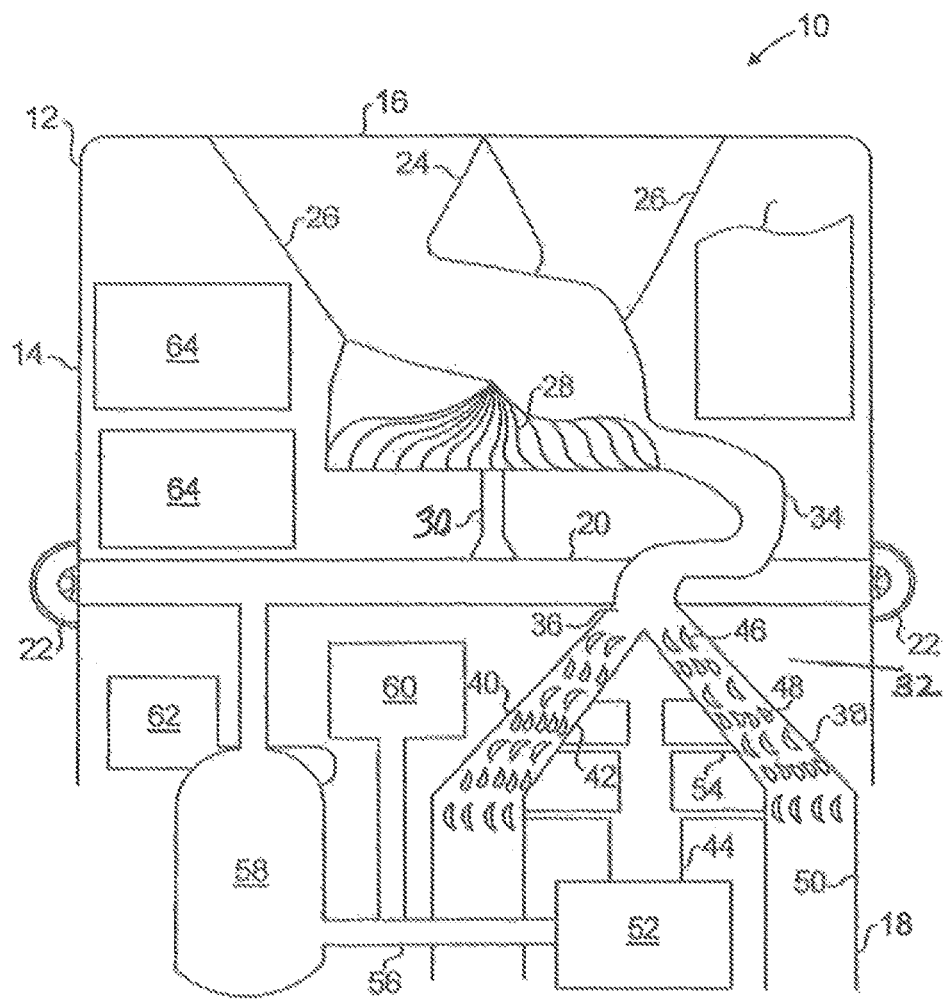
FIG. 1 is a simplified sectional and schematic view of a first embodiment for an auxiliary power propulsion system for a vehicle according to the present invention.

Turning now to the several figures, FIG. 1 illustrates a preferred first embodiment for the turbo shaft version, shown essentially in schematic form, of the system 10 of the invention as it may be incorporated into a vehicle 12, such as an automobile, by way of example. The vehicle 12, reference to an automobile for purposes of illustration only, comprises a body 14, a forward or air intake end 16, a rear or exhaust end 18, and a driven axle 20 mounting a pair of wheels 22.

Continuing with FIG. 1, the system 10 hereof comprises a noise reducing air intake 24 opening to the air intake end 16, where the air intake 24 preferably incorporates a pair of funnels 26, with converging walls, to direct the incoming air to a compressor 28, or centrifuge. The compressor 28 is rotatably driven by a shaft 30, which in turn is driven by axle 20. The compressor is a high lift device that accelerates and compresses the air in a manner similar to a fan, propeller, or jet engine compressor. The compressor greatly increases the potential energy that can be extracted from the air. In any case, compressed air from the compressor 28 is directed to a turbine assembly 32, via channel 34, through an opening 36. The turbine assembly 32 comprises a cone shaped housing 38 having an outer wall 40 and inwardly spaced inner wall 42, a centrally disposed turbine shaft 44, and a plural set of turbine blades 46 alternately positioned with blade vanes 48, where such blade vanes are stationary. Although any number of turbines and/or compressors can be employed, in the embodiment of FIG. 1, there are four concentric arrays of turbine blades 48 and three concentric arrays of guide blades, where the air forced out by the respective blades and vanes are exhausted through a reduced channel exhaust 50 rear of the vehicle. A function thereof is to extract energy from the air passing therethrough. The assembly 32 can be high drag devices such as those used in jet engines, high speed devices similar to windmills, or a combination thereof.

In support of the system 10 to render it functional for its intended purpose, FIG. 1 further illustrates such supporting components. By way of example, the compressor may be driven by a torque converter 52 mounting plural radial arms 54 connected to and rotating a respective said turbine blade 46. Extending from the torque converter 52 is a drive shaft 56 to drive the vehicle's transmission 58 and generator 60. Further, the vehicle may include an electric motor 62 in electrical communication with the generator 60. Additionally, the system may include one or more batteries 64 that are recharged by the generator 60. Finally, although it is preferred that the vehicle will be powered by the electric engine augmented by the air turbine hereof, the system hereof may also be used in conjunction with a conventional power propulsion system such as a gasoline engine 66 that may be incorporated into the system for battery charging and possibly to augment the propulsion of the vehicle.

Figure 2:
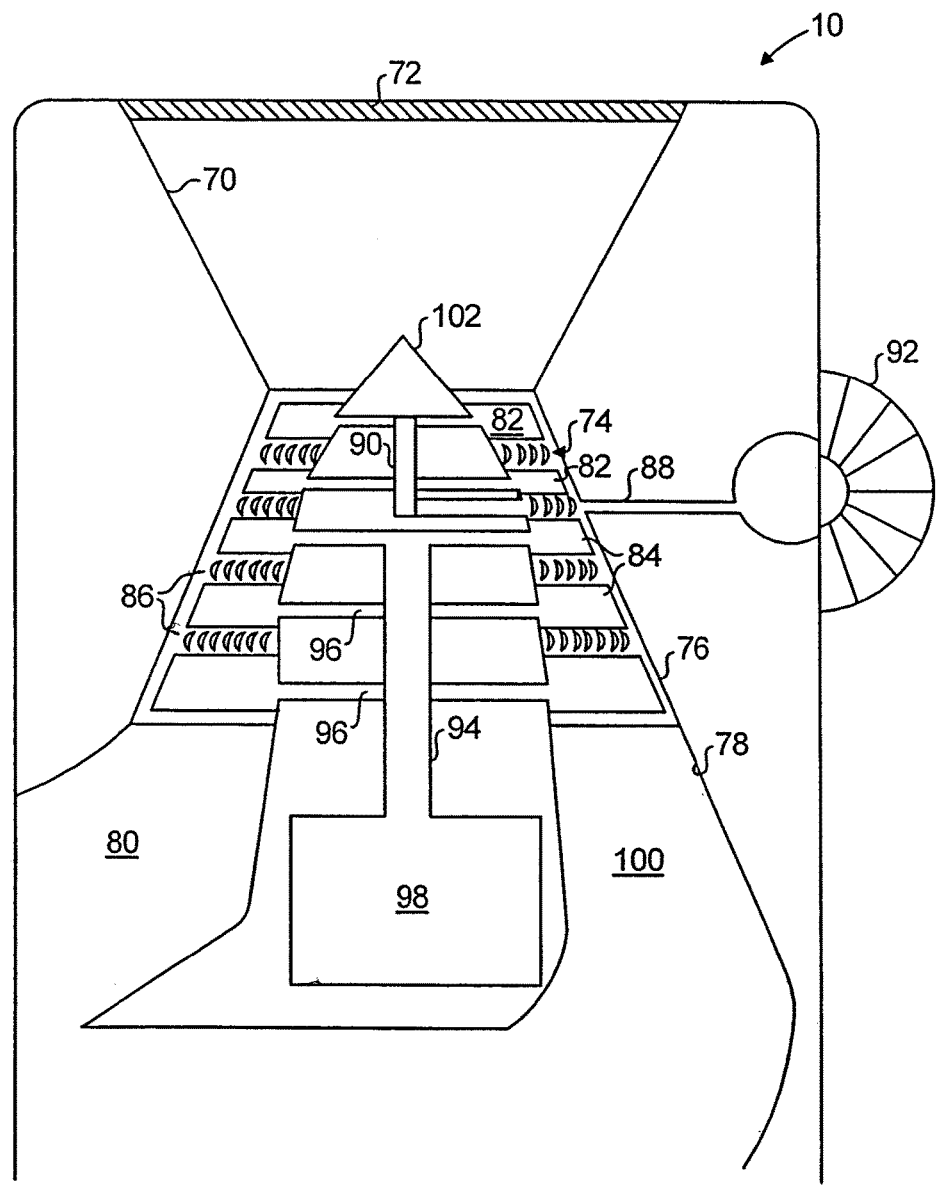
FIG. 2 is a simplified sectional and schematic view of a second embodiment for an auxiliary power propulsion system for a vehicle according to the present invention.

FIG. 2 illustrates a modified, in-line system 10' for providing auxiliary power to a vehicle, more particularly a train, for instance. The modified system 10' includes a tapered air intake 70, which may be provided with a protective grill 72, to prevent intake of debris, and a cone shaped turbine assembly 74. The turbine assembly 74 is characterized by an outer wall 76 and an inwardly spaced inner wall 78 to define an annular space 80 for receiving rotating plural compressor blades 82 and plural turbine blades 84. Interspersed between the turbine blades 84 are a plurality of stationary guide vanes 86, while, stationary stator blades 86 may be positioned between the compressor blades 82. The respective compressor blades 82 are driven by a primary compressor drive shaft 88 connected to an angled drive shaft 90, where the respective compressor blades 82 are driven by radial arms extending from the angled drive shaft 90. Power to the primary drive shaft 88 may be provided by train wheels 92. Connected to the respective turbine blades 84 is a turbine drive shaft 94, where said drive shaft mounts plural radial arms 96 connected to the respective turbine blades 84. The rotating turbine drive shaft drives the generator 98, which are known in the art may be used to recharge a battery, not shown. Alternately, on an electric train that is powered by electricity through wires from the grid, the electricity generated by the system hereof can directly power the train and during peak electrical production excess power generated can simply run the meter backwards, rendering a battery superfluous. Further, an exhaust duct 100 or channel may be incorporated into the system 10'. As a final feature of this modified system 10', a cone shaped head 102 may be included at the air intake end to direct such air into the annular space 80 and hence the blades and vanes, as above noted.

Figure 3:
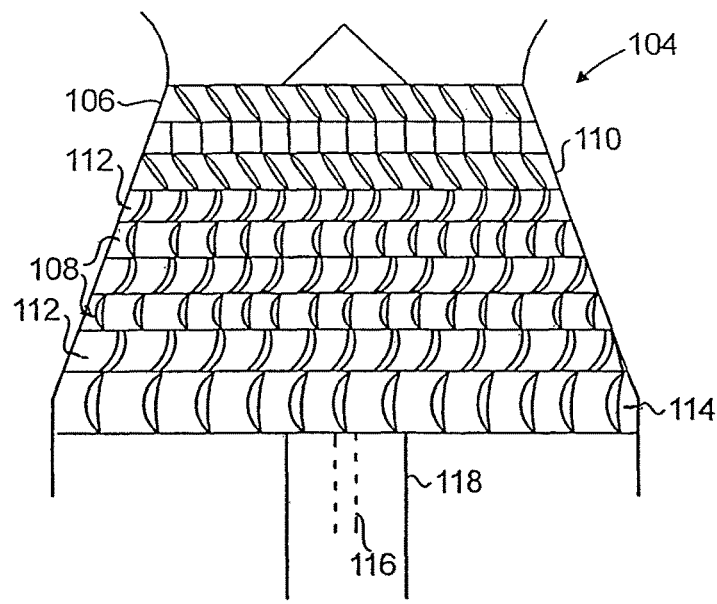
FIG. 3 is a simplified sectional and schematic view for the turbine assembly hereof, showing plural compressor stages, a stationary stator blades section, plural stationary guide vanes, and plural turbine blade sections.

FIG. 3 illustrates a modification for the turbine assembly 104, where the initial incoming air contact is with and through a first stage compressor 106. Thereafter, the assembly includes sequentially a series of stationary stator blades 108, a second stage compressor 110, and alternating series of stationary guide vanes 112 and rotating turbine blades 114. Further, the assembly 104 includes a shaft 116 driven by the turbine blades 114 to send power to a generator or torque converter (not shown), and a shaft 118 to drive the compressors 106, 110.

Figure 4:
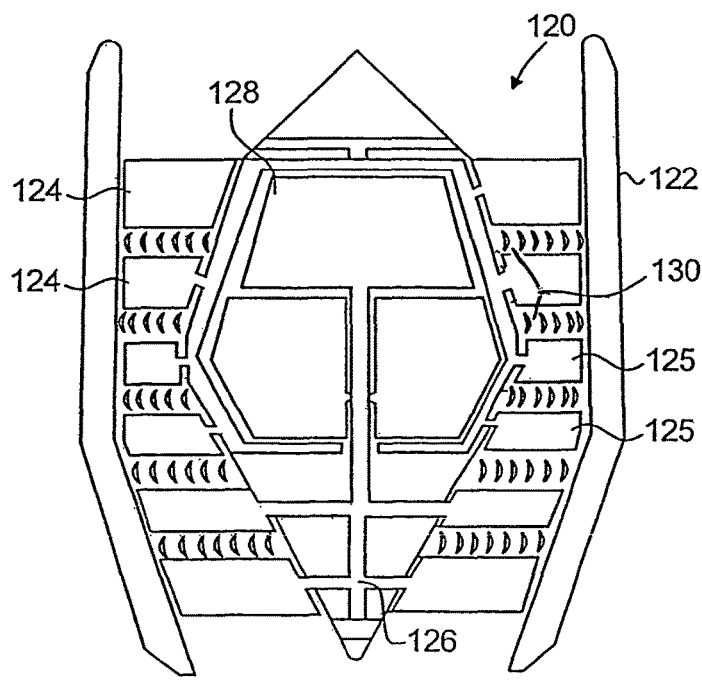
FIG. 4 is a simplified sectional and schematic view for an inline generator system, for an air turbine propulsion system of this invention, such as for use on a high speed vehicle, namely an airplane.
Figure 5:
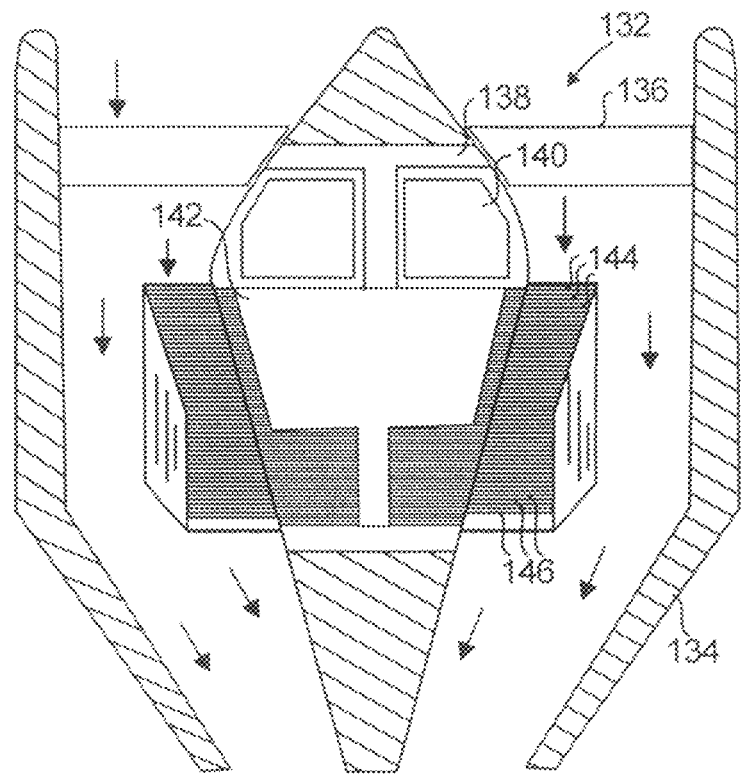
FIG. 5 is a simplified sectional and schematic view of a modified arrangement for an air turbine according to this invention, showing in particular turbofan components.
Figure 6:
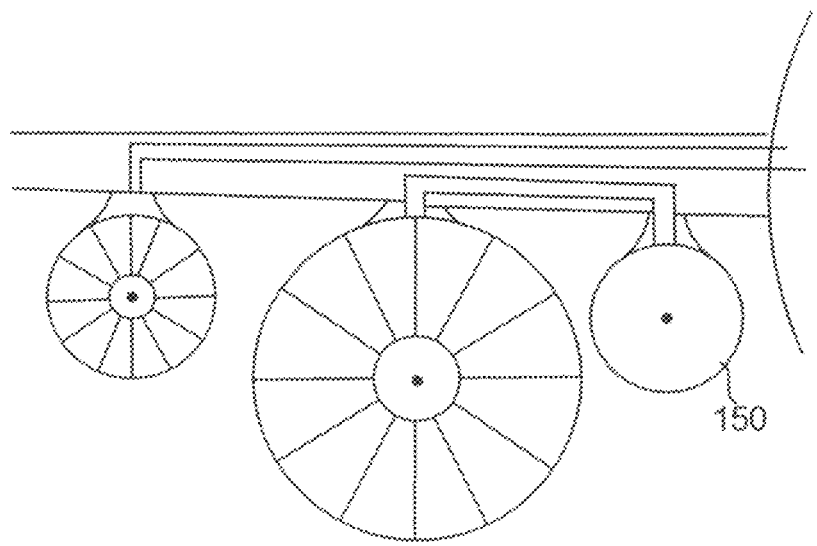
FIG. 6 is a simplified schematic view of a modified power mechanism for use in the system hereof.

For the systems of FIGS. 4-6, the application thereof would be as a non-fuel combusting jet engine that delivers a high speed stream of air to propel the moving vehicle, such as an automobile or airplane. This would be similar to a high bypass turbofan engine, except the normal combustion section would be replaced by an electric motor working in conjunction with the turbines to drive the compressors, generating a high speed stream of air. This engine would produce thrust in the same manner as the bypass section, or cold section, of modern turbofan engines. The additional electricity required to run the electric motor could be provided initially by a battery or bank or series connected batteries, or a gas turbine auxiliary power unit. Once the vehicle is in motion, the electricity to run the electric motor could be generated from additional generators operated by the system itself. If additional generators cannot be feasibly powered by the turbofan type air turbine, then a turbo shaft type air turbine can be utilized to produce electricity.

For these several turbine assemblies of FIGS. 4-6, the energy harnessed by the turbines can be utilized in two basic methods, producing two categories of engines:

a) a first category utilizes the turbines to convert the energy of the compressed air into mechanical energy in a manner similar to wind turbines, turbo prop and turbo shaft engines. This power can be used to generate electricity, drive a mechanical engine, drive a propeller, or propel a vehicle. In these types of applications, the turbines would optimally extract the maximum amount of energy from the compressed air as possible. This would essentially be a non-combusting, high pressure turboprop or turbo shaft air engine. Thus, this category could also be used on autos, trucks, trains and as a free standing wind turbine.

b) a second category of this engine may be used to produce a high speed stream of air to propel a vehicle, for example. This engine could have two main variants, one without any bypass air, similar to a turbojet engine, and one that does utilize bypass air, i.e. a turbofan engine having some of the compressed air bypass the turbine section. The bypass air could be used either primarily to increase the rearward airflow. Either the entire hot section could be replaced by an electric or mechanical drive, or just the combustion section could be replaced by the electric or mechanical drive. In either case, it would be a non-combusting air turbine engine.

Additionally, the powered harnessed from the turbine assembly of the engine can be used for several purposes, including, but not limited thereto:

a) generating electricity to charge batteries, power an electric engine or other electric components;

b) powering pumps, machines and air conditioners;

c) power a vehicle, where the power from the turbine assembly can be sent to a torque converter and transmission, and then subsequently directed to the wheels of the vehicle; and, d) drive the compressor. However, more than one turbine would be preferable to harness enough energy to drive the vehicle or produce electricity as well as driving the compressor.

As described and discussed in regard to FIGS. 1-3, and as noted above, the system hereof has dual applications, namely, provide auxiliary power to a moving vehicle, as discussed extensively previously, and to generate electricity for a stationary or free standing turbine assembly. In either case, the system is an air turbine, non-fuel combusting system.

Considering further the second application, where the system is used as a stationary or free standing air turbine to generate electricity, the compressors will amplify the wind making it much more effective. For this application, the compressors could be driven by numerous ways, including, but not limited to some of the engine's own turbines, a motor, or another air turbine. Although the system could conceivably be effective with no wind; its effectiveness will increase dramatically with wind or relative wind velocity. It will always be more effective than a standard air turbine with any wind velocity.

For use as an air turbine, it can either be rotated into the wind or use a rotating funnel to channel the air to the engine. In this application, the compressors would be preferably driven by either the engines own turbines or another turbine. This would increase the amount and velocity of air that would be utilized by the turbines to produce electricity or other forms of power. This type of application could utilize either currently popular high speed windmills or jet engine type turbines or a combination of the two.

The preferred method of using this device on an auto, truck, train or bus would be to use the high pressure air turbine, of the turbo shaft variety in conjunction with an electric engine. This could either be augmented by a gasoline or diesel engine or used in a pure electric vehicle. The preferred method for driving the compressor(s) would be to utilize a drive shaft powered by either the transmission or directly connected to the axle and driven by the motion of the wheels. The compressor(s) could also be driven by the engines own turbines, another turbine, the electric engine, the brakes or any combination of these.

FIGS. 4 and 5 illustrate several schematic views for an air turbine system according to the present invention. Specifically, FIG. 4 shows a generator mechanism 120 having a generally circular housing 122 containing a pair of low pressure compressors or fans 124, plural rotating turbines 125, plural driven drive shafts 126, and plural electric motors 128, with a torque converter and compressor drive shaft 130. FIG. 5 shows a turbo fan version of an aircraft engine 132 comprising a generally circular housing 134 with a single compressor fan 136, a fan drive shaft 138, and a pair of electric motors 140. Additionally, the mechanism 132 includes a centrally disposed torque converter 142, with plural surrounding, high pressure compressors 144, such as twelve stages, and plural turbines 146, such as seven in number.

In a preferred version of the turbo jet varieties shown above, the air turbine engine is the primary propulsion system for the vehicle, such as an airplane. In this preferred embodiment, the main change from current turbo fan and turbo jet engines is that the power produced by the combustion chamber that burns a mixture of compressed air and fuel, is replaced by power extracted by the turbines from the unburned compressed air generated by the compressors, augmented by an electric engine or engines.

As current jet engine technology has produced turbo fan engines that produce 90% of there power from the cold, or non combusting section, the high pressure air turbine engines (invention) could effectively power an airplane by simply maintaining the thrust from the non combusting, or bypass air, even if all the thrust from the high speed air flow from the combustion section is lost, or converted to mechanical energy. The mechanical energy derived from the turbines in the combustion section of conventional engines can be replaced by energy from the electric motor(s) and turbines driven by the compressed but non combusted air created by the compressors. Since the weight of the fuel required to be carried by the aircraft would be reduced more than the thrust of the engines is reduced, the aircraft could effectively operate with 10-15% less thrust.

This preferred embodiment incorporates an air intake of decreasing size or volume where air is directed to the first stage compressor or fan. This version only employs a fan, however this invention is not limited to a single fan, as multiple fans may be employed as is the case with certain gas turbines. In the turbo fan versions, the compressed air is sent through two different channels, with part of the air directed to subsequent stages or sections of compressors. In a turbo jet version all of the compressed air would be directed to the subsequent compressor stages. The remaining air bypasses the subsequent compressor stages and is directed out the rear of the engine as part of the high speed air flow. The air that is directed to the subsequent compressors stages is compressed to a much greater degree, vastly increasing the potential energy in this air. In the preferred application, Stator vanes (not depicted) are employed to direct the compressed air at the proper angle to most efficiently direct the air to the next compressor. In this depiction stages of compressor are employed, but this invention is not limited to any specific number of compressors or turbines.

The highly compressed air is directed to a series of turbines to extract mechanical energy form the air. This version depicts turbines, but this invention is not limited to any specific number of turbines. Fixed nozzle guide vanes are employed to accelerate the air and shoot it at the correct angle for the moving turbine blades. This mechanical energy is directed through a drive shaft to the torque converter. This energy is augmented by the electric engines and used to power the high pressure compressors and the fan through the fan drive shaft.

In the preferred version, the electric motors are solely used to initially start the rotation of the compressor section. As the compressors rotate at increasing speeds, the high speed air produced by the compressors drives the turbine sections, which convert this energy into mechanical energy. The mechanical energy produced by the turbines combines with energy form the electric motors to power the compressors, enabling the engine to accelerate to operating speed.

Just as in contemporary gas turbine engines, the air flow leaves the turbine section with a very high velocity. This air combined with the high speed air that bypassed the subsequent compressor stages. Since the air turbine engine will not burn the air, the primary reason for high pressure air, in certain applications of the invention, will be to operate additional aircraft systems such as air conditioning and pressurization. Thus, it is also possible to completely replace the entire high pressure section, or what was formerly known as the hot section in a gas turbine, along with its associated high pressure compression section and turbine section with an electric motor. This would just leave what is currently the bypass portion of high velocity air. In this version, turbines are not employed at all. That is, the compressor(s) is driven solely by the electric motor.

Since the operation of high pressure compressors requires a great deal of mechanical energy, this version has the advantage in that less mechanical energy is required. It also has the advantage of a lower weight due to the removal of the high pressure section. However, this version will probably require more electricity to drive the compressors and to operate additional systems normally driven by the turbine section, such as hydraulic pumps. Therefore, it will require greater electrical generating capacity. Finally, since this type of engine will not produce extremely high pressure air, an additional compressor will have to be employed to produce high pressure air. Although centrifugal compressors are generally not effective in jet engine applications, they can be very effective in producing compressed air for other purposes. One for example, could be effectively employed outside of the main aircraft engines to compress air for air conditioning, pressurization and other uses. This could prove to be an advantageous configuration for certain applications.

This version is depicted with the electric motors inside the air turbine engine. This invention is not limited to that configuration as the electric motor(s) can just as easily be positioned outside of the air turbine engine.

The electricity to power the electric motors can be generated by numerous sources, including but not limited to; an electrical generated wind turbine type of this device, the aircraft's auxiliary power unit, a combustion engine, solar panels or other sources and augmented by batteries. The example shown in FIG. 6 depicts the air turbine powered by an externally mounted electric engine 150. The electricity to run the engine is produced by two wing mounted and turbine type air turbines in flight with a gasoline engine used for starting and as backup.

It is recognized that changes, variations and modifications may be made to various embodiments for the air turbine system of this invention without departing from the spirit and scope thereof. Accordingly, no limitation is intended to be imposed thereon except as set forth in the accompanying claims.

The invention claimed is:

1. A power propulsion system for a vehicle, where said system is used in conjunction with a secondary propulsion mechanism comprising a compressor or compressors, said system comprising:
a non-fuel combusting engine powered by an active rotary compressor mechanism to increase the potential energy harnessed by turbines, said non-fuel combusting engine comprising an air intake member opening towards the front of said vehicle, a centrifugal operating compressor actively accelerating and compressing the air passing through said intake member, transmitting said compressed air to a turbine assembly, where said assembly comprises plural concentric vanes, a first set of said vanes being stationary and a second set of said vanes alternately positioned with said first set of vanes, and an air exhaust in communication with said first and second sets of vanes, said system further including a rotary first and second shaft to drive said compressor and said second set of vanes;
said vehicle includes a driven axle in rotative communication with the first shaft to drive said compressor;
said driven axle is in rotative communication with a vehicle transmission, said transmission driving a generator and a torque converter receives power from said second set of said vanes.

2. The auxiliary power propulsion system according to claim 1, wherein said intake member has noise reducing capabilities.

3. The auxiliary power propulsion system according to claim 2, including a housing containing said air turbine engine, wherein said intake member includes a pair of channels directing air to said centrifugal operating compressor.

4. The auxiliary power propulsion system according to claim 1 including an operating windmill having a drive shaft therefrom to drive said compressor.

5. The auxiliary power propulsion system according to claim 1, wherein the second shaft is rotated by the second set of vanes, and the second shaft drives said generator.

6. A non-fuel combusting air turbine system for powering a vehicle, said system comprising:
a non-fuel combusting air turbine engine powered by an axial compressor mechanism that increases the potential energy producing said high velocity stream of air, said air turbine engine comprising an intake member opening towards the front of said vehicle, an axial operating compressor in electrical communication with an electrical generating mechanism actively accelerating and compressing the air passing through said intake member, transmitting said compressed air to a turbine assembly, where said assembly comprises plural concentric vanes, a first set of vanes being stationary and a second set of vanes alternately positioned with said first set of vanes, an air exhaust in communication with said first and second set of vanes, said system further including a rotary first and second shaft to drive said axial compressor mechanism and said second set of vanes;
said vehicle includes a driven axle in rotative communication with the first shaft to drive said axial compressor mechanism;
said driven axle is in rotative communication with a vehicle transmission, said transmission driving a generator and a torque converter receives power from said second set of vanes.

7. The non-fuel combusting air turbine system according to claim 6, where said compressor mechanism utilizes an electric motor to drive said compressor.

8. The non-fuel combusting air turbine system according to claim 6, where said compressor mechanism is augmented by a turbine assembly.

9. The non-fuel combusting air turbine system according to claim 6, wherein said compressor mechanism is an axial operating compressor to actively accelerate and compress said air.

10. The non-fuel combusting air turbine system according to claim 6, including a housing containing said air turbine engine, wherein said intake member includes channel directing air to said axial compressor mechanism.

* * * * *